United States Patent Office 2,755,188
Patented July 17, 1956

2,755,188

METHOD OF INHIBITING THE DEVELOPMENT OF DECAY IN PEACHES, AND THE LIKE

Herman J. Keller, Dunedin, Fla., assignor, by mesne assignments, to Brogdex Company, Orange County, Fla., a corporation of Florida No Drawing. Application October 25, 1951, Serial No. 253,232

9 Claims. (Cl. 99—154)

The present invention relates generally to prevention of decay in peaches, apples, and the like, and more particularly to a novel method of and a composition of matter for inhibiting the development of decay in such fruit during handling between packing houses, and the like, and the ultimate consumer.

There has long existed the need of a practical commercial way of getting peaches and other fruits to consumers throughout the country and elsewhere without excessive deterioration. Ice has been employed in railroad, truck, and ship movement of peaches between packing houses and points of consumption, but the maintenance of peaches, for example, at the lowest temperature which will not damage the fruit only retards the growth and development of brown rot and other deterioration, and does not indefinitely check or suspend the same. The same is true to a greater or lesser extent for apples and some other perishable fresh foods.

Briefly, the present novel method of inhibiting the development of decay in peaches, apples, and the like, during handling comprises gassing the peaches, apples, and the like, with an inhibitor subsequent to processing at the packing house, or the like, and before brown rot and other deterioration have seriously affected the fruit, or other perishable fresh foods. Preferably, the job is accomplished after the crated peaches, or the like, are placed in railroad cars, or other means of transportation. The preferred liquid inhibitor developed for checking brown rot and other deterioration is an admixture which requires for vaporization of a portion thereof the use of a hotplate suitably insulated from the fruit and car, truck, or other transportation medium, at least one component of the inhibitor admixture liquid being poured upon the hot-plate and immediately vaporized in the space about the fruit, which takes an average time of only several minutes. The transportation medium, or the like, preferably is maintained closed following gassing until it is desired to open the same, as at destination, particularly for peaches. The present novel inhibitor admixture preferably employed in the method just outlined comprises trichloroethane and triethylene glycol, a preferred but not limiting admixture basis being in the ratio of thirty-seven parts liquid trichloroethane to one part liquid triethylene glycol, both by weight.

Therefore, an object of the present invention is to provide a novel method of inhibiting the development of brown rot and other deterioration in peaches, apples, and the like, to insure sound fruit in the hands of the ultimate consumer.

Another object is to provide a novel organism inhibitor admixture in liquid form, thereby facilitating handling, which is applied to peaches, apples, and the like, as a gas to inhibit the development of brown rot and other deterioration.

Another object is to provide a novel method of inhibiting the deterioration of peaches, apples, etc., in handling between the trees and the ultimate consumers, which is readily applied to the fruit, is economical, is harmless to human beings, and is highly effective in its percentage of sound fruit delivered to the consumer.

Another object is to provide a novel organism inhibitor for checking deterioration in peaches, apples, and the like, which may be readily adapted and applied in its intended use in the checking of deterioration, which is economical, and which is noninjurious to human beings.

The foregoing and other objects and advantages are apparent from the following description of the invention.

In the commercial handling of peaches, by way of example, the general routine normally includes processing and crating or sacking of the fruit at packing houses following picking and removal from the growing orchards. The crated or sacked fruit is stacked in refrigerated railroad cars, trucks, or other transportation media for transfer to the markets, refrigeration being dispensed with in quite short hauls. However, brown rot and other deterioration develop in peaches from the time the fruit is picked, which may be somewhat retarded in processing and in refrigerated transporting to the market places. In spite of all efforts heretofore made, because of this fact, a large percentage of peaches requiring more than a very few days between picking and purchase by the ultimate consumer either never reach the ultimate consumer or go into the home refrigerators or restaurant boxes in an unsound condition.

The present novel method of inhibiting the development of brown rot and other deterioration in peaches comprises subjecting the fruit to an atmosphere of growth inhibiting gas preferably after the fruit is stacked in railroad cars, trucks, etc., for shipment to the markets. An inhibitor admixture of trichloroethane and triethylene glycol in liquid form has been developed which preferably is in substantially the ratio of from twenty to forty parts liquid trichloroethane to one part liquid triethylene glycol, both by weight. Triethylene glycol has a high vaporization temperature, being above four hundred degrees Fahrenheit, which requires the use of heat to reduce this component of the present inhibitor to a gas for inhibiting deterioration in the peaches. A simple way of providing the gas comprises the use of a hotplate in the railroad car, truck, or the like, suitably insulated from the transportation medium, the peaches and any ice that may be in the transportation medium, upon which the triethylene glycol and a substantially equal amount of trichloroethane are poured while the plate is above four hundred degrees Fahrenheit. The trichloroethane is added to the triethylene glycol to eliminate a fire hazard, gas of the latter being inflammable at sufficiently high temperatures, whereas those of the former do not burn. Only several minutes are required to vaporize this portion of the liquid inhibitor required for a railway carload of peaches. The remaining portion of trichloroethane is poured on the car floor or placed in a container and permitted to vaporize, which will take less than twenty-four hours. After the first-mentioned portion of the liquid inhibitor has been changed to gaseous form, the transportation medium, or the like, is closed and is kept closed until opened at destination, particularly for refrigerated or iced cars. With peaches, brown spots develop on the fruit if the whole admixture is quickly vaporized on the hot-plate. These spots are not rot, but are commercially undesirable.

For a period of seven days following the twenty-four hour gassing period, the present novel inhibitor is effective to check the development of brown rot and other peach deterioration. The process may be repeated if desired at the end of seven days in order to insure another period of time in which the fruit will be effectively preserved against the development of brown rot and other deterioration.

In computing the amount of the component parts of the admixture, experiment has shown that a preferred formula is one hundred and forty cubic centimeters of trichloroethane and from three and a half to seven cubic centimeters of triethylene glycol should be vaporized for each one hundred cubic feet of space left in the railroad car or other media after deducting the total space occupied by the peaches, which is about two-thirds in a standard packed railroad car. In commercial refrigerated railway car experiments, five quarts of the present admixture were used per carload of peaches resulting in sound delivery. A little more of the inhibitor is required where the car is not refrigerated or cooled to achieve saturation of the atmosphere in the car, a well-known principle. Obviously, in some applications of the present invention, the actual space occupied by the fruit must be calculated in order to insure an adequate amount of the admixture, as where a partial carload shipment is involved.

As mentioned, trichloroethane is not required to be flashed to gaseous form, since it will evaporate in the course of a few hours at any temperature above thirty-two degrees Fahrenheit, but it is advisable to mix the component parts of the admixture before vaporization by heat, since the triethylene glycol is thick and does not pour too readily and could ignite were the hot-plate at a sufficiently high temperature. This last-mentioned contingency is substantially eliminated by the mixture of the trichloroethane, since trichloroethane will not burn.

Both laboratory and commercial carload shipment tests demonstrate the remarkable results of the application of the present invention. In one series of eight laboratory tests on Elberta peaches conducted at room temperature in Dunedin, Florida, in July 1951, thirty peaches being used for both gassed and check ungassed fruit in each test, the average results at the end of one day showed 0.5% brown rot in the gassed peaches and 8% brown rot in the check ungassed peaches; at the end of two days, 0.5% and 16%, respectively; at the end of three days, 0.5% and 34%, respectively; at the end of four days, 0.5% and 42%, respectively; at the end of five days, 0.5% and 54%, respectively; at the end of six days, 1.0% and 63%, respectively; and at the end of seven days, 1.0% and 80%, respectively. In each test, the gassed fruit was substantially sealed in a six gallon can for twenty-four hours, substantially four drops of triethylene glycol and one and one-half cubic centimeters of trichloroethane being used. Vaporization of an admixture of four drops of each component was accomplished with a small hot plate, vaporization of the remainder of the trichloroethane being effected in less than twenty-four hours by pouring it into the can out of contact with the fruit. In each test, the can was closed after hot-plate vaporization of the admixture, and was opened after twenty-four hours. The check fruit remained in the room by the can during this first twenty-four hours, and thereafterwards, both gassed and check ungassed fruit were left in the room.

In another recent laboratory test, twenty-six Elberta peaches (South Carolina) were placed in a six gallon can at room temperature (August 1951, in Dunedin, Florida), substantially three drops of triethylene glycol and one and one-fourth cubic centimeters of trichloroethane were vaporized in the can in the manner described above, and the can was closed for twenty-four hours and then opened to atmosphere. A check group of twenty-six Elberta peaches (South Carolina) from the same basket as the gassed group remained alongside the gassed fruit. The following results were noted, all fruit being left exposed to atmosphere at room temperature.

| End of | 2 days | 3 days | 4 days | 5 days |
|---|---|---|---|---|
| Gassed | 26 good, No rots | 26 good, No rots | 25 good, 1 rot | 25 good, 1 rot. |
| Check | 24 good, 2 rots | 22 good, 4 rots | 18 good, 8 rots | 14 good, 12 rots. |

Experimental commercial shipments of peaches in refrigerated cars subjected to the present novel method and inhibitor admixture, as set forth above, have reached the wholesale market in sound condition after many days in shipment. Peaches shipped standard refrigeration along with the gassed fruit have shown as high as five percent rot on reaching the wholesale market.

Apples do not deteriorate as rapidly as peaches, but there is still a large loss between orchards and consumers. Laboratory and commercial carload shipment tests demonstrate the effectiveness of the present invention on apples. In a series of seven laboratory tests conducted at room temperature (Dunedin, Florida, throughout the month of August 1951), using thirty Winesap apples at each test for both gassed and check, the average results showed 0.2% rot in the gassed fruit and 13.0% rot in the check ungassed fruit at the end of five days, and 0.4% rot in the gassed fruit and 33.4% rot in the check ungassed fruit at the end of ten days. The gassed fruit in each instance was substantially sealed in a six gallon can for twenty-four hours, substantially five drops of triethylene glycol and one and one-half cubic centimeters of trichloroethane being used. Vaporization of an admixture of five drops of each component was achieved on a small hot-plate, vaporization of the remainder of the latter component being accomplished in less than twenty-four hours by pouring it into the can out of contact with the fruit. In each instance, the can was closed following hot-plate vaporization of a portion of the inhibitor as mentioned, and opened at the end of twenty-four hours. Thereafterwards, both gassed and check ungassed fruit were left in the open room.

It is manifest that there have been provided a novel method of and a novel composition of matter for inhibiting the development of decay in peaches, apples, and the like, which fulfill the objects and advantages sought therefor.

It is to be understood that the foregoing description has been given by way of illustration and example. It is also to be understood that changes in percentages of the several component parts, substitution of equivalent parts or steps, and rearrangement of parts or steps, which will be readily apparent to one skilled in the art, are contemplated as within the scope of the present invention, which is limited only by the claims which follow.

What is claimed is:

1. A method of inhibiting the development of brown rot and other deterioration in fresh peaches and apples comprising subjecting the fruit to an atmosphere containing deterioration inhibitor gas, said gas being a mixture of a minor portion of triethylene glycol and a major portion of trichloroethane.

2. A method of inhibiting the development of brown rot and other deterioration in fresh peaches and apples comprising subjecting the fruit to an atmosphere containing deterioration inhibitor gas for a predetermined period of time, said gas being a mixture of a minor portion of triethylene glycol and a major portion of trichloroethane.

3. A method of inhibiting the development of brown rot and other deterioration in fresh peaches and apples comprising subjecting the fruit to an atmosphere containing a minor portion of triethylene glycol and a major portion of trichloroethane gases for substantially twenty-four hours.

4. A method of inhibiting the development of brown rot and other deterioration in fresh peaches and apples comprising subjecting the fruit to an atmosphere containing triethylene glycol and trichloroethane gases in which an admixture ratio of substantially twenty to forty parts trichloroethane to one part of triethylene glycol obtains.

5. A method of inhibiting the development of brown rot and other deterioration in fresh peaches and apples comprising subjecting the fruit to an atmosphere containing a minor portion of triethylene glycol and a major portion of trichloroethane gases for a predetermined period of time in a closed space in which an admixture ratio of substantially twenty to forty parts trichloroethane to one part of triethylene glycol obtains.

6. A method of inhibiting the development of brown rot and other deterioration in fresh peaches and apples comprising flashing an admixture of substantially equal parts of trichloroethane and triethylene glycol in a substantially closed area in which peaches and apples are disposed, permitting additional trichloroethane to vaporize, and subjecting the individual product to be treated to an atmosphere containing the vaporized trichloroethane as a major portion and triethylene glycol as a minor portion for a predetermined period of time.

7. A method of inhibiting the development of brown rot and other deterioration in fresh peaches and apples comprising flashing an admixture of substantially equal parts of trichloroethane and triethylene glycol and vaporizing additional trichloroethane in an amount to provide a ratio of substantially twenty to forty parts of the former to one part of the latter.

8. A method of inhibiting the development of brown rot and other deterioration in fresh peaches and apples comprising flashing an admixture of substantially equal parts of trichloroethane and triethylene glycol and vaporizing additional trichloroethane in an amount to provide a ratio of substantially twenty to forty parts of the former to one part of the latter, and maintaining said atmosphere containing trichloroethane and triethylene glycol vapors for a predetermined period of time.

9. A method of inhibiting the development of brown rot and other deterioration in fresh peaches and apples comprising flashing an admixture of substantially equal parts of trichloroethane and triethylene glycol and vaporizing additional trichloroethane in an amount to provide a ratio of substantially twenty to forty parts of the former to one part of the latter and in an amount of from substantially one hundred and forty to two hundred and eighty cubic centimeters of trichloroethane and seven cubic centimeters of triethylene glycol per one hundred cubic feet of free space in the enclosed area.

References Cited in the file of this patent

UNITED STATES PATENTS

| | | |
|---|---|---|
| 2,189,947 | Griffith et al. | Feb. 13, 1940 |
| 2,315,858 | Johnston et al. | Apr. 6, 1943 |
| 2,333,124 | Robertson et al. | Nov. 2, 1943 |
| 2,577,421 | Keller | Dec. 4, 1951 |

OTHER REFERENCES

"Glycol Vapors for Air Sanitation," Soap and Sanitary Chemicals, February 1950, pages 122–124.

"Fumigation Against Grain Weevils With Various Volatile Organic Compounds," U. S. Dept. of Agri., Dept. Bulletin #1313, Wash., D. C., January 26, 1925, page 4.

"Peach Brown Rot," by Roberts et al., U. S. Dept. of Agri., Wash., D. C., Technical Bulletin #328, November 1932, pages 48–51.